United States Patent
Saito et al.

(10) Patent No.: US 11,879,658 B2
(45) Date of Patent: Jan. 23, 2024

(54) AIR-CONDITIONING VENTILATION SYSTEM

(71) Applicant: Mitsubishi Electric Corporation, Tokyo (JP)

(72) Inventors: Makoto Saito, Tokyo (JP); Yunqing Fan, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 17/288,217

(22) PCT Filed: Jan. 10, 2019

(86) PCT No.: PCT/JP2019/000512
§ 371 (c)(1),
(2) Date: Apr. 23, 2021

(87) PCT Pub. No.: WO2020/144808
PCT Pub. Date: Jul. 16, 2020

(65) Prior Publication Data
US 2021/0404695 A1    Dec. 30, 2021

(51) Int. Cl.
*F24F 11/77*    (2018.01)
*F24F 11/46*    (2018.01)
*F24F 11/65*    (2018.01)
*F24F 110/20*   (2018.01)
*F24F 110/10*   (2018.01)

(52) U.S. Cl.
CPC .............. *F24F 11/77* (2018.01); *F24F 11/46* (2018.01); *F24F 11/65* (2018.01); *F24F 2110/10* (2018.01); *F24F 2110/20* (2018.01)

(58) Field of Classification Search
CPC .. F24F 11/46; F24F 11/65; F24F 11/77; F24F 2110/10; F24F 2110/20
(Continued)

(56) References Cited

U.S. PATENT DOCUMENTS 9,874,360 B2 * 1/2018 Hamada ................ F24F 1/0035
2005/0144963 A1   7/2005 Peterson et al.
2013/0180700 A1   7/2013 Aycock

FOREIGN PATENT DOCUMENTS

CN   107883531 A    4/2018
JP   2000-291997 A  10/2000
(Continued)

OTHER PUBLICATIONS

Japanese International Search Report dated Feb. 12, 2019, issued in corresponding International Patent Application No. PCT/JP2019/000512 (and English Machine Translation).
(Continued)

*Primary Examiner* — Allen R. B. Schult
(74) *Attorney, Agent, or Firm* — POSZ LAW GROUP, PLC (57) ABSTRACT

An air-conditioning ventilation system includes a ventilation device configured to ventilate an air-conditioned space while controlling a ventilation rate, an air-conditioning apparatus that includes a heat exchanger configured to exchange heat between refrigerant and air and that is configured to operate while controlling an air-conditioning capacity thereof to bring an indoor temperature in the air-conditioned space to a setting temperature, and a controller. The controller performs normal control that causes the ventilation device to operate to ventilate the air-conditioned space at a ventilation rate corresponding to the air-conditioning capacity of the air-conditioning apparatus, and recovery control that controls the ventilation rate of the ventilation device such that an integrated value of an amount of ventilation for a time duration from activation of the ventilation device under the normal control falls within a standard ventilation range including a standard integrated value of an amount of ventilation obtained by causing the ventilation device to
(Continued)

operate to ventilate the air-conditioned space at a standard ventilation rate for a time duration having a same length as the time duration.

7 Claims, 8 Drawing Sheets

(58) Field of Classification Search
USPC .......................................................... 454/228
See application file for complete search history.

(56) References Cited

FOREIGN PATENT DOCUMENTS

| | | |
|---|---|---|
| JP | 2004-340490 A | 12/2004 |
| JP | 2005-098571 A | 4/2005 |
| JP | 2012-017868 A | 1/2012 |

OTHER PUBLICATIONS

Office Action dated May 16, 2022 issued in corresponding CN Patent Application No. 201980087497.6 (and English translation).
Extended European Search Report dated Dec. 22, 2021 issued in corresponding European patent application No. 19909600.9.
Office Action dated Dec. 26, 2022 issued in corresponding CN Patent Application No. 201980087497.6 (and English machine translation).
Office Action dated Jun. 20, 2023 issued in corresponding Chinese Patent Application No. 201980087497.6 (and English machine translation).

* cited by examiner

AIR-CONDITIONING VENTILATION SYSTEM

CROSS REFERENCE TO RELATED APPLICATION

This application is a U.S. National Stage Application of International Application No. PCT/JP2019/000512, filed on Jan. 10, 2019, the contents of which are incorporated herein by reference.

TECHNICAL FIELD

The present invention relates to an air-conditioning ventilation system including a ventilation device and an air-conditioning apparatus.

BACKGROUND ART

In recent years, due to an increase in airtightness and thermal insulation of building envelops, it has become common to ventilate continuously 24 hours. Thus, it is required by law to install equipment that replaces an amount of air corresponding to half the indoor capacity in one hour. Also, due to an increase in airtightness and thermal insulation of building envelops, the air conditioning load is reduced, so that installed air-conditioning apparatuses are more often operated with an air-conditioning capacity less than or equal to half the maximum air-conditioning capacity thereof.

Generally, a ventilation device and an air-conditioning apparatus operate independently, and do not functionally cooperate with each other. Although it may be possible to reduce the power consumption of the air-conditioning apparatus and improve the thermal environment by temporarily increasing or reducing the ventilation rate, there is no communication means between the air-conditioning apparatus and the ventilation device, and therefore their functions are not effectively used.

To avoid this problem, there has been a system that communicably connects a ventilation device and an air-conditioning apparatus to make the ventilation device and the air-conditioning apparatus cooperate with each other (see Patent Literature 1). In Patent Literature 1, the ventilation rate of a ventilation device is controlled based on the power consumption of an air-conditioning apparatus. Specifically, when the power consumption of the air-conditioning apparatus exceeds a predetermined setting value, the ventilation rate is changed from "high" to "low" to reduce the amount of outdoor air to be suctioned, thereby reducing the power consumption of the air-conditioning apparatus.

CITATION LIST

Patent Literature

Patent Literature 1: Japanese Unexamined Patent Application Publication No. 2012-17868

SUMMARY OF INVENTION

Technical Problem

In Patent Literature 1, the ventilation rate is set based on the power consumption of the air-conditioning apparatus. However, if ventilation is continued at the set ventilation rate for a long period of time, the following problem occurs. For example, if the ventilation rate is maintained at "low" for a long period of time, the required amount of ventilation cannot be secured.

The present invention has been made to overcome the above problem, and an object thereof is to provide an air-conditioning ventilation system capable of maintaining an appropriate amount of ventilation during operation.

Solution to Problem

An air-conditioning ventilation system according to an embodiment of the present invention includes: a ventilation device configured to ventilate an air-conditioned space while controlling a ventilation rate; an air-conditioning apparatus including a heat exchanger configured to exchange heat between refrigerant and air, the air-conditioning apparatus being configured to operate while controlling an air-conditioning capacity thereof to bring an indoor temperature in the air-conditioned space to a setting temperature; and a controller configured to perform normal control that causes the ventilation device to operate to ventilate the air-conditioned space at a ventilation rate corresponding to the air-conditioning capacity of the air-conditioning apparatus, and recovery control that controls the ventilation rate of the ventilation device such that an integrated value of an amount of ventilation for a time duration from activation of the ventilation device under the normal control falls within a standard ventilation range including a standard integrated value of an amount of ventilation obtained by causing the ventilation device to operate to ventilate the air-conditioned space at a standard ventilation rate for a time duration having a same length as the time duration.

Advantageous Effects of Invention

According to the air-conditioning ventilation system of the above embodiment of the present invention, the controller controls the ventilation rate of the ventilation device such that the integrated value of the amount of ventilation falls within the standard ventilation range including the standard integrated value. Therefore, it is possible to maintain an appropriate amount of ventilation during operation.

DESCRIPTION OF EMBODIMENTS

Embodiment 1

Figure 1:
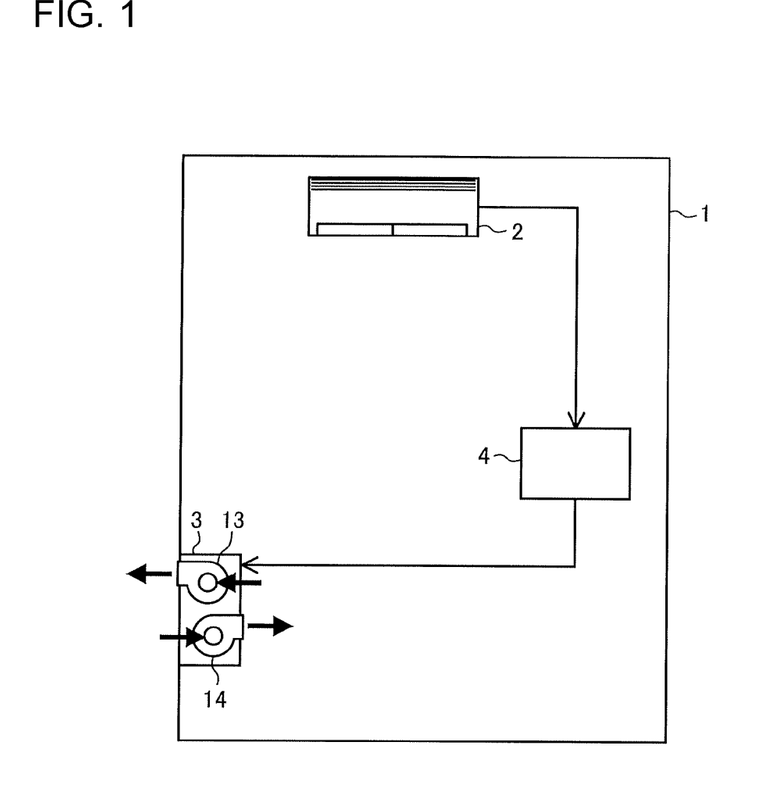
FIG. 1 is a schematic configuration diagram of an air-conditioning ventilation system according to Embodiment 1 of the present invention.
Figure 2:
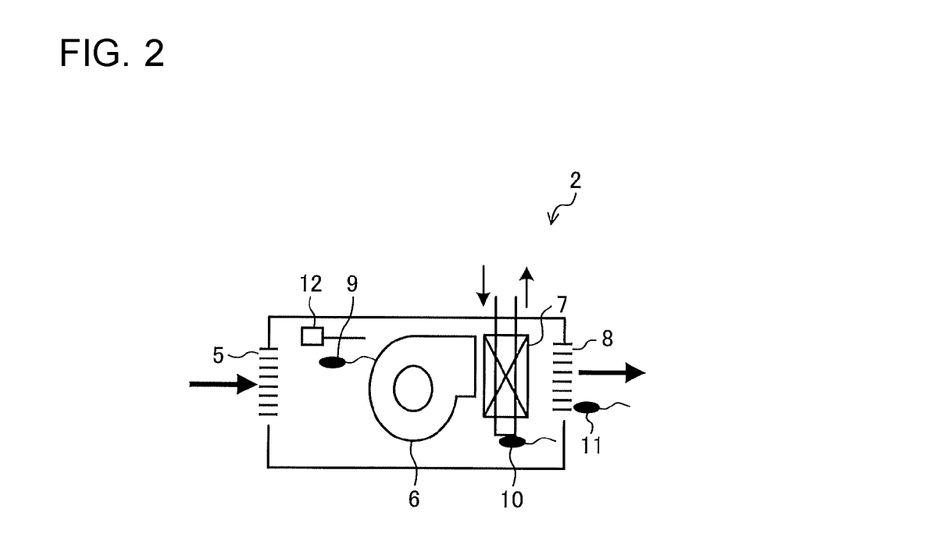
FIG. 2 is a configuration diagram of an air-conditioning apparatus according to Embodiment 1 of the present invention.

FIG. 1 is a schematic configuration diagram of an air-conditioning ventilation system according to Embodiment 1 of the present invention. FIG. 2 is a configuration diagram of an air-conditioning apparatus according to Embodiment 1 of the present invention. The configuration and operation of the air-conditioning ventilation system according to Embodiment 1 of the present invention will be described with reference to FIGS. 1 and 2.

The air-conditioning ventilation system includes an air-conditioning apparatus 2 configured to condition air in an air-conditioned space 1, a ventilation device 3 configured to ventilate the air-conditioned space 1, and a controller 4. The ventilation device 3 includes an exhaust fan 13 configured to exhaust air from the air-conditioned space 1 to the outside, and an air-supply fan 14 configured to introduce outdoor air to the indoor space. The exhaust fan 13 and the air-supply fan 14 are configured such that the ventilation rate is adjustable in different levels.

The ventilation device 3 operates continuously 24 hours to ventilate the air-conditioned space 1. The ventilation rate is adjustable in three levels including "standard" for securing the amount of ventilation corresponding to half the indoor capacity in one hour, "high" that is higher than "standard", and "low" that is lower than "standard". The rotation speeds of the exhaust fan 13 and the air-supply fan 14 are determined in advance for each of "low", "standard", and "high", and the ventilation device 3 operates each of the exhaust fan 13 and the air-supply fan 14 at a rotation speed corresponding to the level of the ventilation rate. When the air-conditioning apparatus 2 is stopped, the ventilation device 3 operates at "standard". When the ventilation device 3 operates at "standard", a required amount of ventilation can be secured. Note that as described above, the ventilation rate of "standard" does not have to be set based on the ventilation rate for securing the amount of ventilation corresponding to half the indoor capacity in one hour, and may be set based on the progress of contamination indoors or other factors. Further, the number of levels in which the ventilation rate is adjusted is not limited to three, and may be greater than three. The ventilation rate only needs to be adjustable in at least three levels.

Referring to FIG. 2, the air-conditioning apparatus 2 includes, in a casing 2a, a circulation fan 6 and a heat exchanger 7. The air-conditioning apparatus 2 further includes a temperature sensor 9 configured to measure an indoor temperature of the air-conditioned space 1, a temperature sensor 10 configured to measure a temperature of the refrigerant flowing through the heat exchanger 7, a temperature sensor 11 configured to measure a blown-out air temperature, and a humidity sensor 12 that calculates a relative humidity in the air-conditioned space 1.

The casing 2a has an air inlet 5 and an air outlet 8. The circulation fan 6 suctions the indoor air of the air-conditioned space 1 into the casing 2a through the air inlet 5, causes the air to pass through the heat exchanger 7, and blows out the air into the air-conditioned space 1 through the air outlet 8. The heat exchanger 7 is connected to a compressor, a heat exchanger, a pressure reducing device, and other devices disposed in an outdoor unit (not illustrated) by pipes to form a refrigerant circuit. The air-conditioning apparatus 2 cools and heats the air-conditioned space 1, by causing refrigerant to circulate in the refrigerant circuit such that the refrigerant exchanges heat with air in the heat exchanger 7.

The air-conditioning apparatus 2 controls the air-conditioning capacity to bring the indoor temperature in the air-conditioned space 1 to a setting temperature that is set from, for example, a remote control device. Further, the air-conditioning apparatus 2 obtains the actual air-conditioning capacity of the air-conditioning apparatus 2 during operation, and transmits the obtained air-conditioning capacity to the controller 4. The actual air-conditioning capacity is obtained by multiplying a temperature difference between the indoor temperature measured by the temperature sensor 9 and the blown-out air temperature measured by the temperature sensor 11, by a known air volume of the circulation fan 6.

The controller 4 is a device configured to make the air-conditioning apparatus 2 and the ventilation device 3 cooperate with each other, and is communicably connected to the air-conditioning apparatus 2 and the ventilation device 3. The communication may be wired, or may be wireless. In FIG. 1, the arrows connecting the devices indicate the flow of information among the devices. The controller 4 includes dedicated hardware or a central processing unit (CPU) that executes a program stored in a memory. The controller 4 may be a separate unit from the air-conditioning apparatus 2 as illustrated in FIG. 1, or may be an integral unit with the air-conditioning apparatus 2.

The controller 4 controls the ventilation device 3 based on information received from the air-conditioning apparatus 2. The controller 4 includes normal control that causes the ventilation device 3 to operate at a ventilation rate corresponding to the air-conditioning capacity of the air-conditioning apparatus 2, and recovery control that avoids insufficient ventilation or excess ventilation due to the normal control. The control on the ventilation device 3 will be described below.

The following describes the operation of the air-conditioning ventilation system. The operation of the air-conditioning ventilation system will be described by taking a cooling operation as an example.

First, the operation of the air-conditioning apparatus 2 will be described. When the operation of the air-conditioning apparatus 2 is started, the circulation fan 6 operates, and refrigerant flows through the heat exchanger 7. During a cooling operation, low-temperature refrigerant is supplied from the outdoor unit (not illustrated) to the heat exchanger 7. The refrigerant that has been supplied to the heat exchanger 7 exchanges heat with air sent from the circulation fan 6 to the heat exchanger 7, and cools the air. As a result, the air-conditioned space 1 is cooled. The temperature of refrigerant supplied to the heat exchanger 7 varies with the air-conditioning capacity of the air-conditioning apparatus 2. During a cooling operation, the temperature decreases when the air-conditioning capacity is increased. During a heating operation the temperature increases when the air-conditioning capacity is increased.

The air-conditioning apparatus 2 operates while controlling the air-conditioning capacity such that the indoor temperature measured by the temperature sensor 9 is maintained at the setting temperature. The following describes air-conditioning capacity control of the air-conditioning apparatus 2.

Figure 3:
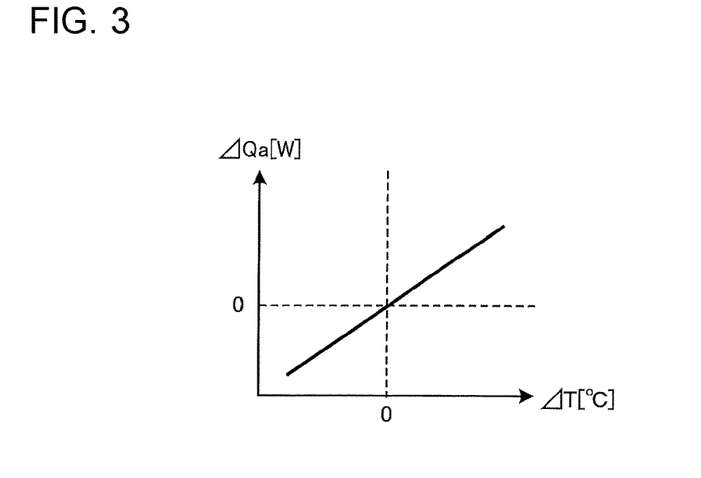
FIG. 3 is a diagram for explaining an air-conditioning capacity control amount ΔQa used for air-conditioning capacity control of the air-conditioning apparatus according to Embodiment 1 of the present invention.
Figure 4:
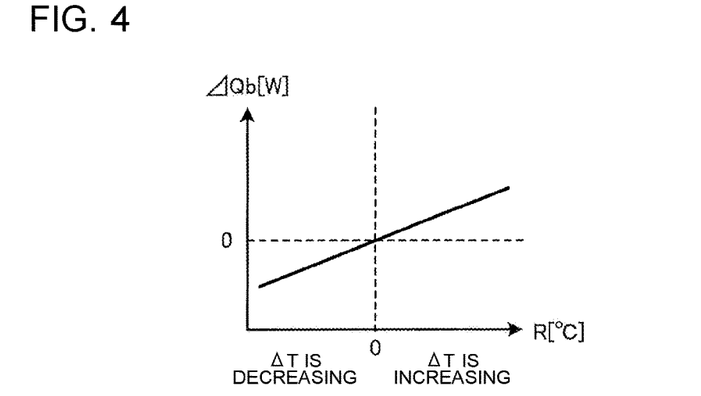
FIG. 4 is a diagram for explaining an air-conditioning capacity control amount ΔQb used for air-conditioning capacity control of the air-conditioning apparatus according to Embodiment 1 of the present invention.

FIG. 3 is a diagram for explaining an air-conditioning capacity control amount ΔQa used for air-conditioning capacity control of the air-conditioning apparatus according to Embodiment 1 of the present invention. In FIG. 3, the horizontal axis represents a temperature difference ΔT between the indoor temperature and a setting temperature, and the vertical axis represents ΔQa. FIG. 4 is a diagram for explaining an air-conditioning capacity control amount ΔQb used for air-conditioning capacity control of the air-conditioning apparatus according to Embodiment 1 of the present invention. In FIG. 4, the horizontal axis represents a change amount R in the temperature difference ΔT, and the vertical axis represents ΔQb. The change amount R in the temperature difference ΔT is obtained by $R=\Delta T - \Delta T_{n-1}$, where ΔT is the present temperature difference, and the $\Delta T_{n-1}$ is the previous temperature difference.

A control unit of the air-conditioning apparatus 2 controls the air-conditioning capacity based on the temperature difference ΔT between the indoor temperature measured by the temperature sensor 9 and a setting temperature. More specifically, the control unit of the air-conditioning apparatus 2 calculates an air-conditioning capacity command value $Q_{n+1}$, for example, at control intervals of 30 minutes, using the following Equation (1):

$$Q_{n+1} = Q_n + \Delta Qa + \Delta Qb \quad (1)$$

where $Q_n$ is the present air-conditioning capacity [W];

ΔQa is the air-conditioning capacity control amount [W] corresponding to the temperature difference ΔT between the indoor temperature and the setting temperature; and ΔQb is the air-conditioning capacity control amount [W] corresponding to the tendency of changes in the temperature difference.

Here, $Q_{n+1} \leq Q_{max}$ is satisfied.

The air-conditioning capacity control amount ΔQa is obtained from the temperature difference ΔT and the graph illustrated in FIG. 3. The air-conditioning capacity control amount ΔQb is obtained from the change amount R of the temperature difference ΔT and the graph illustrated in FIG. 4. In this example, each of ΔQa and ΔQb are calculated using a graph. However, each of ΔQa and ΔQb may be calculated using a table or an arithmetic operation.

The control unit of the air-conditioning apparatus 2 calculates the air-conditioning capacity command value $Q_{n+1}$ at control intervals based on the above Equation (1), and controls the air-conditioning capacity of the air-conditioning apparatus 2 by, for example, transmitting the air-conditioning capacity command value $Q_{n+1}$ to the compressor of the outdoor unit. In this manner, if the indoor temperature is higher than the setting temperature during a cooling operation, the air-conditioning apparatus 2 starts operating with an air-conditioning capacity corresponding to the temperature difference ΔT, and thereafter increases the air-conditioning capacity while ΔQa+ΔQb>0. Then, the temperature difference ΔT continuously decreases toward zero, and ΔQa+ΔQb<0 is satisfied at a certain point. In response, the air-conditioning apparatus 2 operates to reduce the air-conditioning capacity. With this operation, the indoor temperature becomes equal to the setting temperature.

As described above, the air-conditioning apparatus 2 obtains the actual air-conditioning capacity while controlling the air-conditioning capacity based on the temperature difference ΔT between the indoor temperature and the setting temperature, and transmits information on the air-conditioning capacity to the controller 4. The controller 4 controls the ventilation rate of the ventilation device 3 based on the information on the air-conditioning capacity received from the air-conditioning apparatus 2. In the following, control of the ventilation rate will be described.

Figure 5:
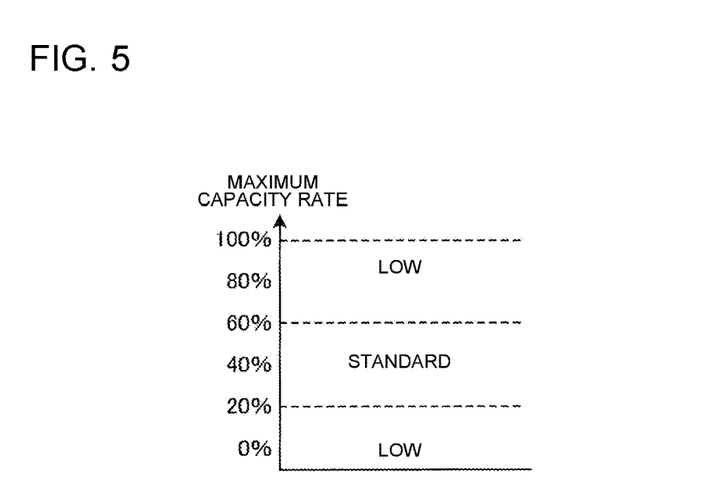
FIG. 5 is a diagram for explaining ventilation rate control on the ventilation device according to Embodiment 1 of the present invention.

FIG. 5 is a diagram for explaining ventilation rate control on the ventilation device according to Embodiment 1 of the present invention. In FIG. 5, the vertical axis represents the maximum capacity rate [%].

The ventilation rate of the ventilation device 3 is set based on the air-conditioning capacity of the air-conditioning apparatus 2. In this example, the maximum capacity rate [%] is used as the index of the air-conditioning capacity. The maximum capacity rate may be the present air-conditioning capacity with respect to the physical maximum air-conditioning capacity of the air-conditioning apparatus 2, or may be the present rotation speed with respect to the physical maximum rotation speed of the compressor of the air-conditioning apparatus 2. Further, the ventilation device 3 may be controlled based on the air-conditioning capacity itself. That is, the ventilation device 3 only needs to be controlled based on the air-conditioning capacity.

In FIG. 5, the maximum capacity rate is divided into three levels using thresholds of 20% and 60%. If the maximum capacity rate is intermediate, the ventilation rate of the ventilation device 3 is set to "standard". If the maximum capacity rate is low or high, the ventilation rate is set to "low".

Figure 6:
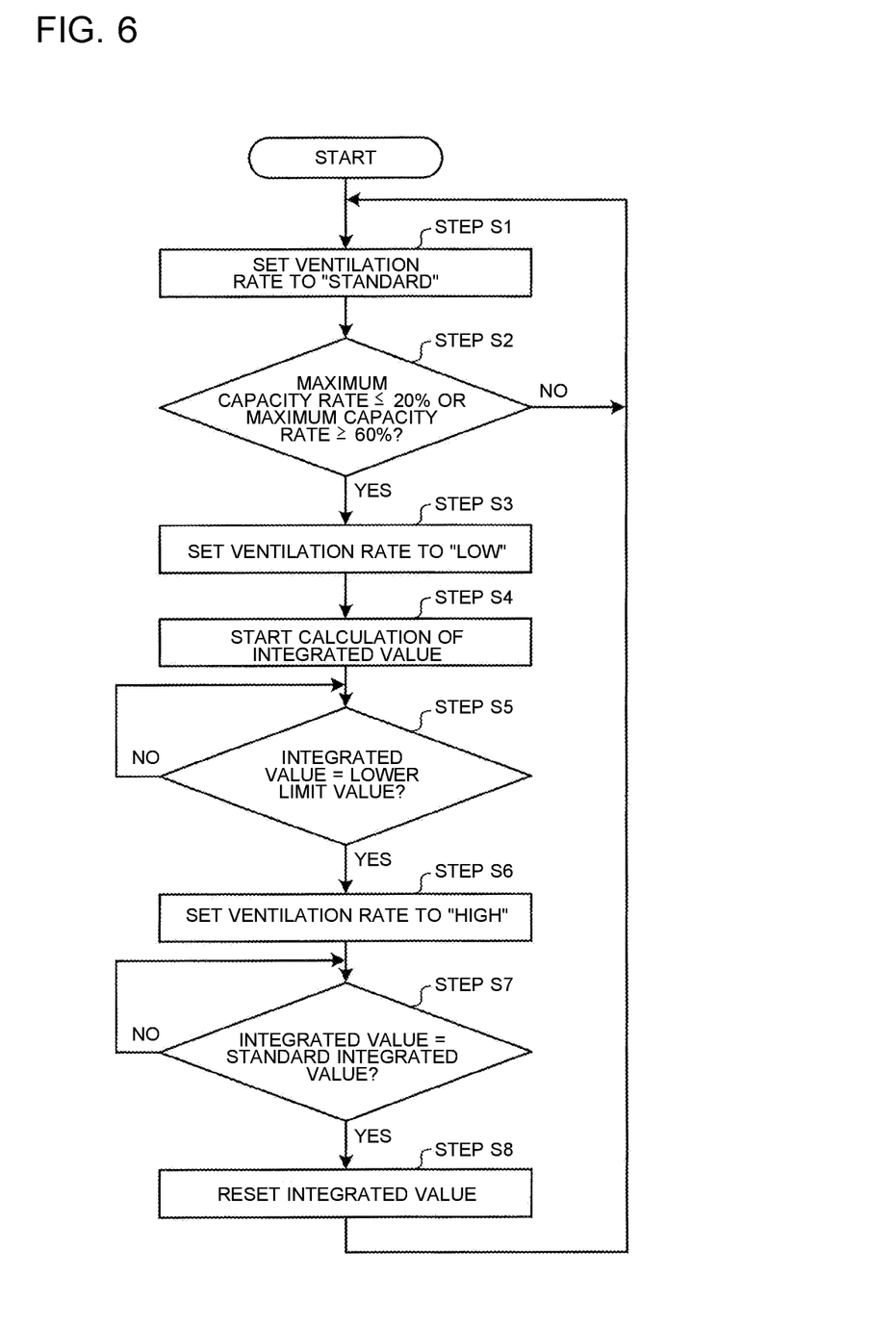
FIG. 6 is a flowchart illustrating a ventilation rate control operation of the ventilation device according to Embodiment 1 of the present invention.

FIG. 6 is a flowchart illustrating a ventilation rate control operation of the ventilation device according to Embodiment 1 of the present invention.

When the operation starts, the controller 4 sets the ventilation rate of the ventilation device 3 to "standard", and starts ventilation (step S1). Then, the controller 4 controls the ventilation device 3 to the ventilation rate corresponding to the air-conditioning capacity received from the air-conditioning apparatus 2. Specifically, the controller 4 calculates the maximum capacity rate based on the air-conditioning capacity received from the air-conditioning apparatus 2, and determines whether the maximum capacity rate is less than or equal to 20% or greater than or equal to 60% (step S2). If the maximum capacity rate is not less than or equal to 20% nor greater than or equal to 60% (No in step S2), the process returns to step S1, in which the controller 4 continues ventilation while maintaining the ventilation rate of the ventilation device 3 at "standard". In this manner, it is possible to stabilize the indoor temperature while securing the required amount of ventilation.

Meanwhile, if the maximum capacity rate is less than or equal to 20% or greater than or equal to 60% (Yes in step S2), the controller 4 changes the ventilation rate of the ventilation device 3 from "standard" to "low" (step S3) to reduce the amount of outdoor air to be suctioned. In this step, if the maximum capacity rate is greater than or equal to 60%, the air-conditioning capacity of the air-conditioning apparatus 2 is high. Accordingly, it becomes possible to quickly form a comfortable cool environment by reducing the amount of outdoor air to be suctioned. If the maximum capacity rate is less than or equal to 20%, the air-conditioning capacity of the air-conditioning apparatus 2 is low. Accordingly, it becomes possible to reduce variation in the indoor temperature by reducing the amount of outdoor air to be suctioned.

Here, if the ventilation rate continues to be "low" for a long period of time, the required amount of ventilation cannot be secured. In consideration of this, in Embodiment 1, recovery control of the amount of ventilation is performed to prevent insufficient ventilation after the ventilation rate is set to "low".

In the recovery control, the following steps S4 to S8 are performed such that the integrated value of the amount of ventilation for a time duration t from when the ventilation rate is set to "low" in step S3 falls within the standard ventilation range. The standard ventilation range is a range including an integrated value of the amount of ventilation (hereinafter referred to as a "standard integrated value") obtained by operating the ventilation device 3 at "standard" for the same time duration t.

After the ventilation rate is set to "low" in step S3, the controller 4 starts a calculation of the integrated value of the amount of ventilation (step S4). When the integrated value becomes equal to the lower limit value of the standard ventilation range after continuing the operation at the ventilation rate "low" (Yes in step S5), in other words, when the integrated value is about to be out of the standard ventilation range, the controller 4 changes the ventilation rate from "low" to "high" to increase the ventilation rate (step S6).

In this manner, the ventilation rate is increased to increase the amount of outdoor air to be suctioned, thereby preventing insufficient ventilation. Then, the controller 4 continues ventilation while maintaining the ventilation rate at "standard" (No in step S7) until the integrated value becomes equal to the standard integrated value. When the integrated value becomes equal to the standard integrated value (Yes in step S7), the controller 4 ends the recovery control and resets the integrated value (step S8). Then, the process returns to step S1.

With the above operation, it is possible to perform ventilation continuously 24 hours while preventing an unacceptable level of insufficient ventilation.

Figure 7:
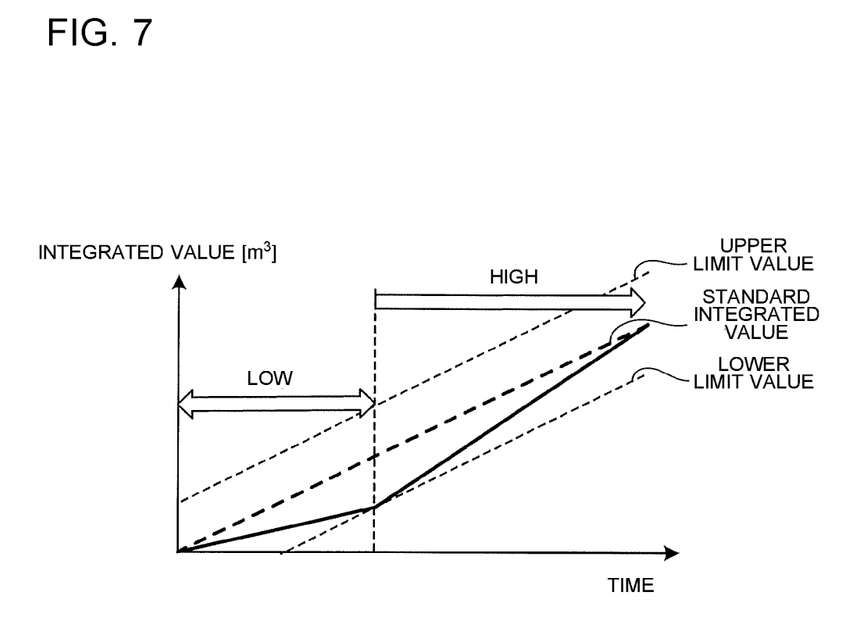
FIG. 7 is a diagram for explaining a recovery control operation of insufficient ventilation by the air-conditioning ventilation system according to Embodiment 1 of the present invention.

FIG. 7 is a diagram for explaining a recovery control operation of insufficient ventilation by the air-conditioning ventilation system according to Embodiment 1 of the present invention. In FIG. 7, the horizontal axis represents time, and the vertical axis represents the integrated value [$m^3$]. In FIG. 7, changes in the integrated value are indicated by the solid line. The standard integrated value is indicated by the thick dashed line, and the upper limit value and the lower limit value of the standard ventilation range are indicated by the thin dashed lines.

As illustrated in FIG. 7, when the ventilation rate is maintained at "low", the integrated value deviates from standard integrated value toward the lower limit value. When the integrated value reaches the lower limit value, the ventilation rate changes from "low" to "high", and the integrated value increases to reach the standard integrated value.

Although the cooling operation has been described, similar control is performed in the case of a heating operation.

As described above, according to the air-conditioning ventilation system of Embodiment 1, normal control is performed that causes the ventilation device 3 to operate at a ventilation rate corresponding to the air-conditioning capacity of the air-conditioning apparatus 2. The controller 4 performs recovery control of the ventilation amount that controls the ventilation rate of the ventilation device 3 such that the integrated value of the amount of ventilation for a time duration from activation of the ventilation device 3 under the normal control falls within a standard ventilation range including the standard integrated value. In this manner, it is possible to maintain an appropriate amount of ventilation during operation. Note that the ventilation rate of "standard" may be appropriately set according to the actual use conditions or other conditions. For example, as described above, the ventilation rate of "standard" may be set based on the ventilation rate for securing the amount of ventilation corresponding to half the indoor capacity in one hour, or may be set based on the progress of contamination indoors.

In Embodiment 1, when the integrated value becomes equal to the lower limit value of the standard ventilation range, the controller 4 increases the ventilation rate of the ventilation device 3 such that the integrated value becomes equal to the standard integrated value. This makes it possible to avoid insufficient ventilation.

In Embodiment 1, the ventilation device 3 is configured such that the ventilation rate is adjustable in at least three levels including low, standard, and high. The controller 4 sets the ventilation rate of the ventilation device 3 under the normal control to "standard" when the air-conditioning capacity of the air-conditioning apparatus 2 is intermediate, and sets the ventilation rate of the ventilation device 3 under the normal control to "low" when the air-conditioning capacity is low or high. In this manner, when the air-conditioning capacity is high, the indoor temperature can quickly be brought close to the setting temperature by a reduction in ventilation rate. Also, when the air-conditioning capacity is low, the indoor temperature can be stabilized by a reduction in ventilation rate.

Embodiment 2

In Embodiment 1, the ventilation rate of the ventilation device 3 is controlled based on the maximum capacity rate. Meanwhile, in Embodiment 2, the ventilation device 3 is controlled using the humidity in the air-conditioned space 1 in addition to the maximum capacity rate during a cooling operation, and is controlled using the refrigerant temperature in addition to the maximum capacity rate during a heating operation. In the following, the differences of Embodiment 2 from Embodiment 1 will be mainly described.

The configuration of the air-conditioning ventilation system is the same as that of Embodiment 1 illustrated in FIG. 1.

In Embodiment 1, the air-conditioning apparatus 2 obtains the actual air-conditioning capacity of the air-conditioning apparatus 2, and transmits the obtained air-conditioning capacity to the controller 4. In Embodiment 2, the air-conditioning apparatus 2 transmits the humidity measured by the humidity sensor 12 and the refrigerant temperature measured by the temperature sensor 10 to the controller 4, in addition to the air-conditioning capacity.

(Cooling Operation)

During a cooling operation, the air-conditioning apparatus 2 performs control for increasing the air-conditioning capacity when the cooling load is high. Thus, the temperature of the refrigerant flowing through the heat exchanger 7 decreases, so that the air-conditioned space 1 is dehumidified. However, if the cooling load is excessively low, control for increasing the air-conditioning capacity is not performed, so that dehumidification cannot be performed. As a result, the comfort level of the humidity environment in the air-conditioned space 1 is reduced. In consideration of this, in Embodiment 2, the ventilation rate of the ventilation device 3 is controlled taking into account the humidity in the air-conditioned space 1, thereby affecting the control of the air-conditioning capacity of the air-conditioning apparatus 2 and avoiding a situation where dehumidification cannot be performed. In the following, the details of the control will be described.

Figure 8:
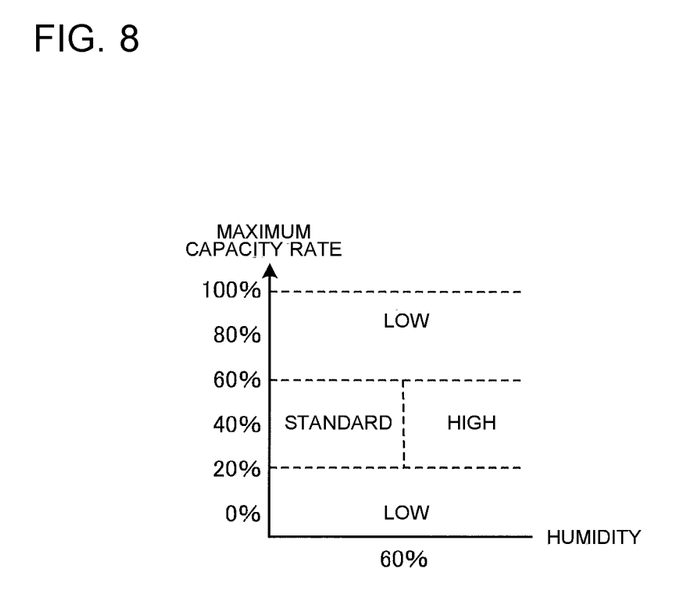
FIG. 8 is a diagram for explaining ventilation rate control on the ventilation device during a cooling operation according to Embodiment 1 of the present invention.

FIG. 8 is a diagram for explaining ventilation rate control on the ventilation device during a cooling operation according to Embodiment 1 of the present invention. In FIG. 8, the horizontal axis represents the humidity [%] of the air-conditioned space 1, and the vertical axis represents the maximum capacity rate [%].

When the maximum capacity rate is less than 20% or greater than 60%, the ventilation rate of the ventilation device 3 is set to "low". When the maximum capacity rate is greater than or equal to 0% and less than or equal to 60%, the ventilation rate of the ventilation device 3 is set based on whether the humidity is less than or equal to a preset humidity. In this example, the preset humidity is 60%. Accordingly, the ventilation rate is set to "standard" when the humidity is less than or equal to 60%, and is set to "high" when the humidity is greater than 60%.

Figure 9:
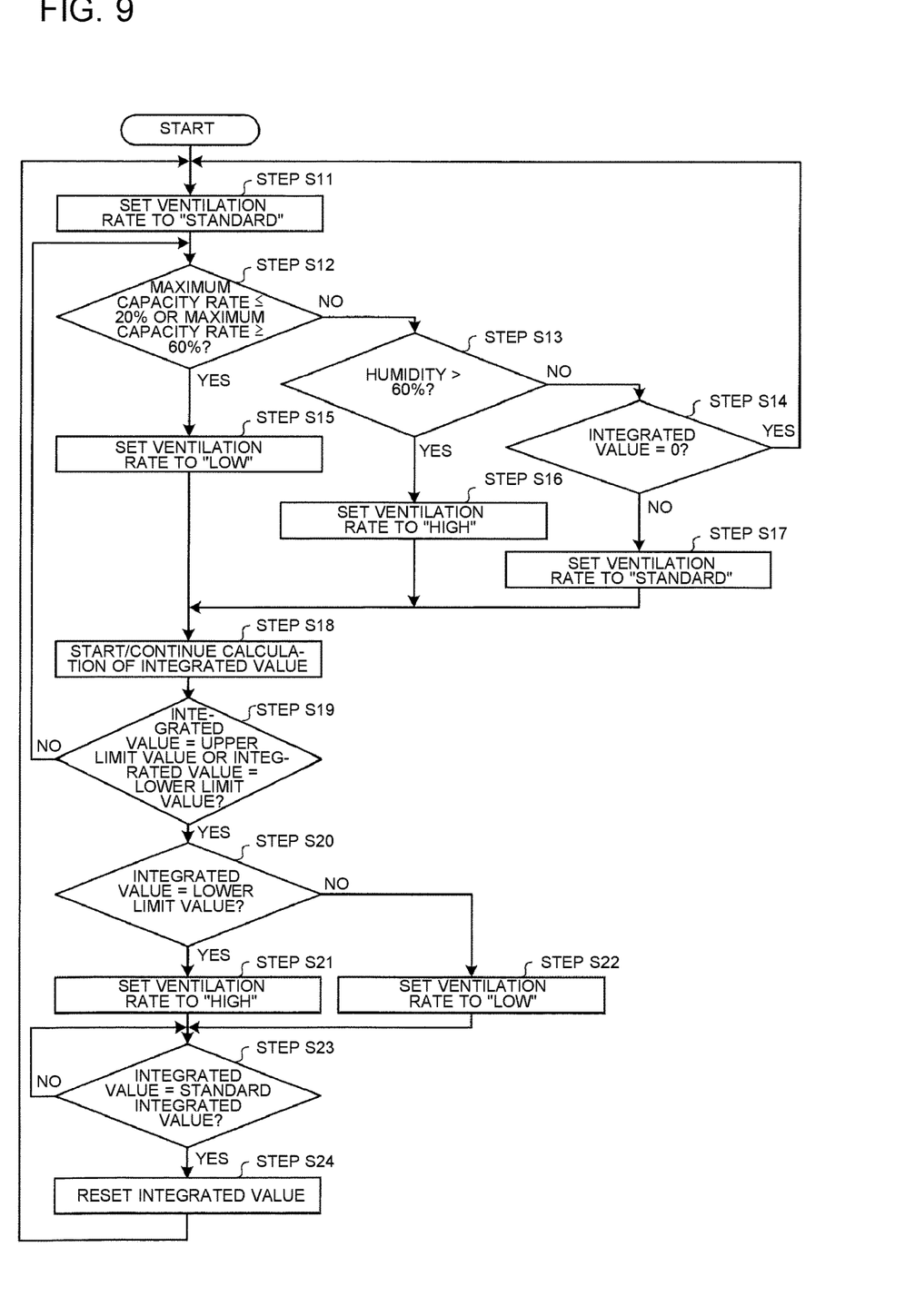
FIG. 9 is a flowchart illustrating a ventilation rate control operation of the ventilation device during a cooling operation according to Embodiment 2 of the present invention.

FIG. 9 is a flowchart illustrating a ventilation rate control operation of the ventilation device during a cooling operation according to Embodiment 2 of the present invention.

When the operation starts, the controller 4 sets the ventilation rate of the ventilation device 3 to "standard", and starts ventilation (step S11). Then, the controller 4 determines the ventilation rate based on the air-conditioning capacity and the humidity received from the air-conditioning apparatus 2 to control the ventilation device 3 (steps S12 to S17). Specifically, the controller 4 calculates the maximum capacity rate based on the air-conditioning capacity received from the air-conditioning apparatus 2, and determines whether the maximum capacity rate is less than or equal to 20% or greater than or equal to 60% (step S12).

If the maximum capacity rate is not less than or equal to 20% nor greater than or equal to 60% (No in step S12), then the controller 4 determines whether the humidity measured by the humidity sensor 12 is greater than 60% (step S13). If the humidity is not greater than 60% (No in step S13), then the controller 4 determines whether the integrated value is zero (step S14). The integrated value is supposed to be set to zero when starting the operation. If the integrated value is zero (Yes in step S14), the process returns to step S11, in which the ventilation device 3 continues to ventilate at "standard". In this manner, it is possible to stabilize the indoor temperature while securing the required amount of ventilation. If the integrated value is not zero (No in step S14), the calculation of the integrated value has already been started in step S18 described below, and therefore the controller 4 sets the ventilation rate back to "standard" (step S17).

Meanwhile, if the maximum capacity rate is less than or equal to 20% or greater than or equal to 60% (Yes in step S12), the controller 4 changes the ventilation rate of the ventilation device 3 from "standard" to "low" (step S15). In this step, if the maximum capacity rate is greater than or equal to 60%, the air-conditioning capacity of the air-conditioning apparatus 2 is high. Accordingly, it becomes possible to quickly form a comfortable cool environment, by changing the amount of ventilation of the ventilation device 3 from "standard" to "low" to reduce the amount of outdoor air to be suctioned. If the maximum capacity rate is less than or equal to 20%, the air-conditioning capacity of the air-conditioning apparatus 2 is low. Accordingly, it becomes possible to reduce variation in the indoor temperature by reducing the amount of outdoor air to be suctioned.

Meanwhile, if the maximum capacity rate is not less than or equal to 20% nor greater than or equal to 60% (No in step S12) and the humidity is high and greater than 60%, the controller 4 changes the ventilation rate of the ventilation device 3 from "standard" to "high" (step 316) to increase the amount of outdoor air to be suctioned. As the amount of suctioned outdoor air is increased, the indoor temperature temporarily increases. Therefore, the temperature difference ΔT increases, which affects the control of the air-conditioning capacity described with reference to FIGS. 3 and 4. As a result, the air-conditioning apparatus 2 performs control for increasing the air-conditioning capacity. As the control for increasing the air-conditioning capacity is performed, the refrigerant temperature of the heat exchanger 7 decreases. Therefore, the amount of dehumidification by the air-conditioning apparatus 2 increases, so that the humidity in the indoor air is reduced. In this manner, since the ventilation rate is controlled taking into account the humidity, it is possible to avoid a situation where dehumidification cannot be performed due to an excessively low cooling load, and provide a more comfortable low-humidity environment.

After the ventilation rate is changed to "low" or "high" in the manner described above, if this setting is maintained for a long period of time, the following problem occurs. Specifically, if the ventilation rate continues to be set at "low" for a long period of time, the required amount of ventilation cannot be secured. Meanwhile, if the ventilation rate continues to be set at "high" for a long period of time, the amount of suctioned outdoor air is increased, resulting in excess ventilation. In the case of excess ventilation, an excessive air conditioning load needs to be processed, so that the power consumption is increased. To solve this problem, in Embodiment 2, recovery control of the amount of ventilation is performed to avoid insufficient ventilation and excess ventilation.

In the recovery control, the following steps S18 to S24 are performed such that the integrated value of the amount of ventilation for a time duration t from when the ventilation rate is set to "low" or "high" in step S15 or S17 falls within the standard ventilation range.

After the ventilation rate is set to "low" or "high" in step S15 or S17, the controller 4 starts a calculation of the integrated value (step 318). After continuing the operation at the ventilation rate "high" or "low", the controller 4 determines whether the integrated value is equal to the upper limit value or the lower limit value of the standard ventilation range (step S19). If the integrated value is not equal to the upper limit value or the lower limit value (No in step S19), the process returns to step S12. Then, the controller 4 performs the operations described above. That is, once the controller 4 starts a calculation of the integrated value, the controller 4 controls the ventilation rate based on the maximum capacity rate and the humidity (steps S12 to S17) and continues to calculate the integrated value (step S18) until the integrated value becomes equal to the upper limit value or the lower limit value.

Then, if the integrated value becomes equal to the lower limit value of the standard ventilation range (Yes in step S20), the controller 4 forcibly changes the amount of ventilation of the ventilation device 3 to "high" (step S21). That is, if the integrated value becomes equal to the lower limit value after setting the ventilation rate to "low" in step S3 and continuing the operation, in other words, if the integrated value is about to be out of the standard ventilation range, the controller 4 changes the ventilation rate from "low" to "high" to bring back the integrated value of the ventilation amount of the air-conditioned space 1 to the standard integrated value. In this manner, the ventilation rate is increased to increase the amount of outdoor air to be suctioned, thereby preventing insufficient ventilation.

Meanwhile, if the integrated value becomes equal to the upper limit value (No in step S20) after setting the ventilation rate to "high" in step S16 and continuing the operation, in other words, if the integrated value is about to be out of the standard ventilation range, the controller 4 changes the ventilation rate from "high" to "low" to bring back the integrated value of the ventilation amount of the air-conditioned space 1 to the standard integrated value (Step S22). In this manner, the ventilation rate is reduced to reduce the amount of outdoor air to be suctioned, thereby minimizing the increase in indoor temperature due to suction of outdoor air and minimizing the increase in air conditioning load.

If the integrated value becomes equal to the standard integrated value (step S23) after setting the ventilation rate to "high" or "low" in step S21 or S22 and continuing the operation, the controller 4 resets the integrated value (step S24). Then, the process returns to step S11, in which the controller 4 sets the ventilation rate back to "standard".

With the above operation, it is possible to perform ventilation continuously 24 hours while preventing an unacceptable level of insufficient ventilation or excess ventilation.

Figure 10:
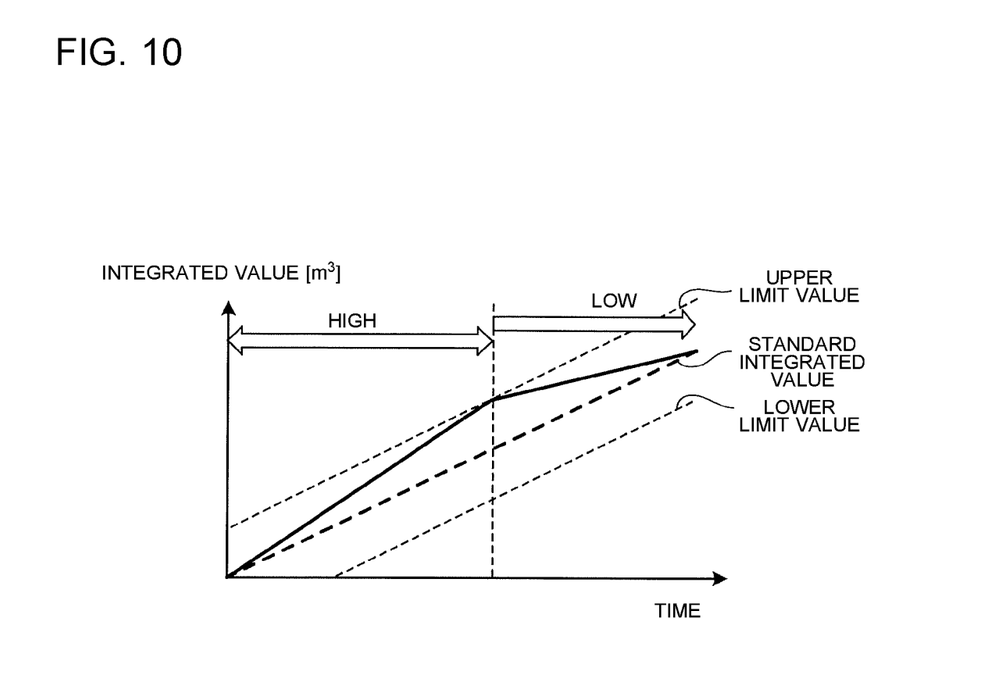
FIG. 10 is a diagram for explaining a recovery control operation of the amount of ventilation by an air-conditioning ventilation system according to Embodiment 2 of the present invention.

FIG. 10 is a diagram for explaining a recovery control operation of the amount of ventilation by the air-conditioning ventilation system according to Embodiment 2 of the present invention. In FIG. 10, the horizontal axis represents time, and the vertical axis represents the integrated value [m³]. In FIG. 10, changes in the integrated value are indicated by the solid line. The standard integrated value is indicated by the thick dashed line, and the upper limit value and the lower limit value of the standard ventilation range are indicated by the thin dashed lines.

As illustrated in FIG. 10, when the ventilation rate is maintained at "high", the integrated value deviates from standard integrated value toward the upper limit value. When the integrated value reaches the upper limit value, the ventilation rate changes from "high" to "low", and the integrated value decreases to reach the standard integrated value. The recovery control operation performed by maintaining the ventilation rate at "low" is the same as that of FIG. 7 in Embodiment 1.

(Heating Operation)

The following describes operations during a heating operation.

During a heating operation, if the outdoor air temperature is high, the temperature of the air blown out of the air-conditioning apparatus 2 into the air-conditioned space 1 (hereinafter referred to as a blown-out temperature) is stabilized at low temperature. If the outdoor air temperature is low, the blown-out temperature is stabilized at high temperature. When the blown-out temperature is stabilized at low temperature, it means that the temperature of the refrigerant flowing through the heat exchanger 7 is low. If the refrigerant temperature becomes lower than the setting refrigerant temperature (for example, 40 degrees), the blown-out temperature decreases. This gives a feeling of cold air to the user even though a heating operation is performed. In consideration of this, in Embodiment 2, the ventilation rate of the ventilation device 3 is controlled based on the refrigerant temperature, thereby affecting the control of the air-conditioning capacity of the air-conditioning apparatus 2 and reducing a feeling of cold air when the outdoor air temperature is high. In the following, the details of the control will be described.

Figure 11:
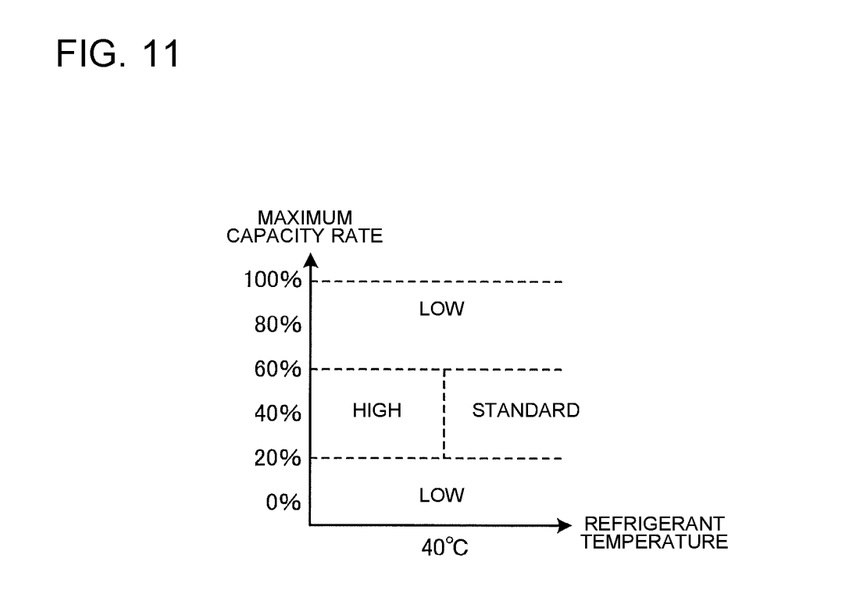
FIG. 11 is a diagram for explaining ventilation rate control on the ventilation device during a heating operation according to Embodiment 2 of the present invention.

FIG. 11 is a diagram for explaining ventilation rate control on the ventilation device during a heating operation according to Embodiment 2 of the present invention. In FIG. 11, the horizontal axis represents the refrigerant temperature [degree], and the vertical axis represents the maximum capacity rate [%].

When the maximum capacity rate is less than 20% or greater than 60%, the ventilation rate of the ventilation device 3 is set to "low". When the maximum capacity rate is greater than or equal to 0% and less than or equal to 60%, the ventilation rate of the ventilation device 3 is set based on whether the refrigerant temperature is lower than or equal to a setting refrigerant temperature. In this example, the setting refrigerant temperature is 40 degrees. Accordingly, the ventilation rate is set to "high" when the refrigerant temperature is lower than or equal to 40 degrees, and is set to "standard" when the refrigerant temperature is higher than 40 degrees.

Figure 12:
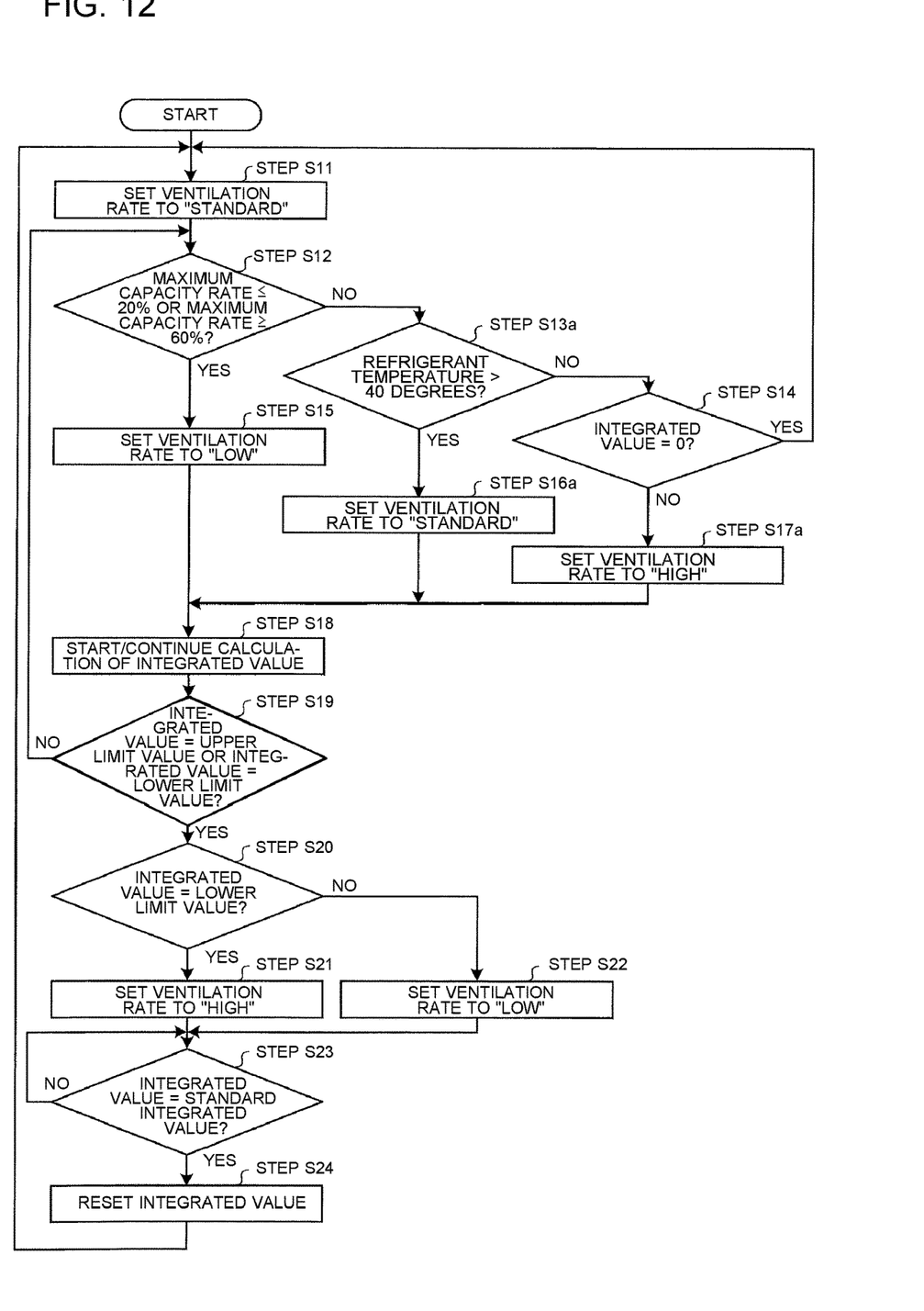
FIG. 12 is a flowchart illustrating a ventilation rate control operation of the ventilation device during a heating operation according to Embodiment 2 of the present invention.

FIG. 12 is a flowchart illustrating a ventilation rate control operation of the ventilation device during a heating operation according to Embodiment 2 of the present invention. The flowchart of FIG. 12 differs from the flowchart of a cooling operation illustrated in FIG. 9 only in steps S13a, S16a, and S17a. In the following, the steps different from those of FIG. 9 will be mainly described.

When the maximum capacity rate is greater than 20% and less than 60% (No in step S12), the indoor environment is becoming stable. Then, if the refrigerant temperature is higher than 40 degrees (Yes in Step S13a), the controller 4 causes the ventilation device 3 to operate while maintaining the ventilation rate at "standard" (step S16a). Meanwhile, if the refrigerant temperature is lower than or equal to 40 degrees (No in step S13a), the blown-out air of the air-conditioning apparatus 2 gives a greater feeling of cold air, so that the indoor environment deteriorates. Accordingly, the controller 4 changes the ventilation rate of the ventilation device 3 from "standard" to "high" (step S17a) to reduce the amount of outdoor air to be suctioned, thereby temporarily reducing the indoor temperature. As the indoor temperature decreases, the temperature difference ΔT increases. Accordingly, the air-conditioning apparatus 2 performs an operation that increases the air-conditioning capacity. As a result, the refrigerant temperature increases, thereby reducing a feeling of cold air due to the airflow blown out of the air-conditioning apparatus 2.

As described above, according to Embodiment 2, it is possible to avoid a situation where the amount of ventilation is insufficient as in Embodiment 1. Further, in Embodiment 2, when the integrated value of the ventilation amount from activation of the ventilation device 3 under the normal control becomes equal to the upper limit value of the standard ventilation range, the controller 4 reduces the ventilation rate of the ventilation device 3 such that the integrated value becomes equal to the standard integrated value. This makes it possible to avoid insufficient ventilation.

In Embodiment 2, the controller 4 causes the ventilation device 3 to operate at a ventilation rate corresponding to the air-conditioning capacity of the air-conditioning apparatus 2 and the humidity in the air-conditioned space 1, under normal control during a cooling operation. In this manner, since the ventilation rate can be controlled taking into account the humidity in the air-conditioned space 1 in addition to the air-conditioning capacity, it is possible to provide a comfortable low-humidity environment.

The ventilation device 3 is configured such that the ventilation rate is adjustable in at least three levels including low, standard, and high. The controller 4 sets the ventilation rate of the ventilation device 3 under the normal control during a cooling operation to any of the following (1) to (3).

(1) When the air-conditioning capacity of the air-conditioning apparatus 2 is intermediate and the humidity in the air-conditioned space 1 is less than or equal to the preset humidity, the ventilation rate is set to "standard".

(2) When the air-conditioning capacity of the air-conditioning apparatus 2 is intermediate and the humidity in the air-conditioned space 1 is greater than the preset humidity, the ventilation rate is set to "high".

(3) When the air-conditioning capacity of the air-conditioning apparatus 2 is low or high, the ventilation rate is set to "low".

In this manner, it is possible to control the ventilation rate based on the air-conditioning capacity, and improve the dehumidification effect of the air-conditioning apparatus 2 by increasing the ventilation rate under high-humidity conditions during a cooling operation.

In Embodiment 2, the controller 4 causes the ventilation device 3 to operate at a ventilation rate corresponding to the air-conditioning capacity of the air-conditioning apparatus 2 and the temperature of the refrigerant flowing through the heat exchanger 7 of the air-conditioning apparatus 2, under normal control during a heating operation. In this manner, since the ventilation rate can be controlled taking into account the refrigerant temperature in addition to the air-conditioning capacity, it is possible to reduce a feeling of cold air due to the airflow blown out of the air-conditioning apparatus 2.

The controller 4 sets the ventilation rate of the ventilation device 3 under the normal control during a heating operation to any of the following (1) to (3).

(1) When the air-conditioning capacity of the air-conditioning apparatus 2 is intermediate and the temperature of the refrigerant flowing through the heat exchanger 7 of the air-conditioning apparatus 2 is lower than or equal to the setting refrigerant temperature, the ventilation rate is set to "high".

(2) When the air-conditioning capacity of the air-conditioning apparatus 2 is intermediate and the temperature of the refrigerant flowing through the heat exchanger 7 of the air-conditioning apparatus 2 is higher than the setting refrigerant temperature, the ventilation rate is set to "standard".

(3) When the air-conditioning capacity of the air-conditioning apparatus 2 is low or high, the ventilation rate is set to "low".

In this manner, it is possible to control the ventilation rate based on the air-conditioning capacity. Further, under the condition where the uncomfortable feeling due to cold air during a heating operation is increased, it is possible to increase the temperature of the blown-out air of the air-conditioning apparatus 2 by increasing the ventilation rate, and avoid giving a feeling of cold air to the user.

In the above Embodiments 1 and 2, specific values such as the thresholds for dividing the maximum capacity rate into three levels, the preset humidity, and the setting refrigerant temperature are merely examples, and may be appropriately set according to the actual use conditions or other conditions.

As for the air-conditioning ventilation system, the following modification may be made to the configuration illustrated in FIG. 1. Even in such a case, it is possible to obtain the same effects.

Figure 13:
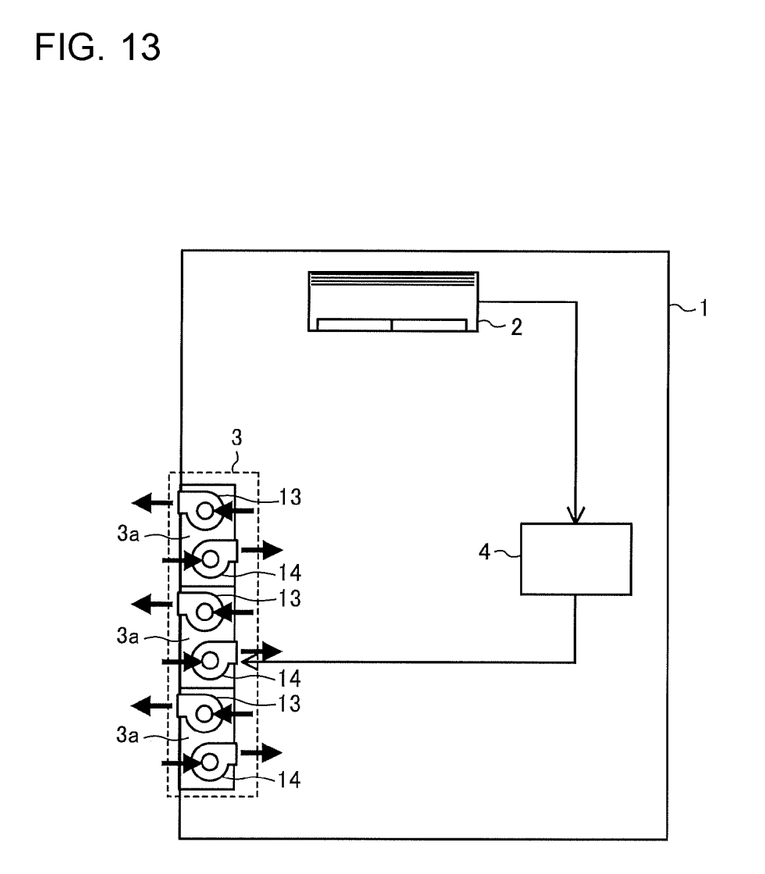
FIG. 13 is a diagram illustrating a modification of the air-conditioning ventilation systems according to Embodiments 1 and 2 of the present invention.

FIG. 13 is a diagram illustrating a modification of the air-conditioning ventilation systems according to Embodiments 1 and 2 of the present invention.

As illustrated in FIG. 13, the ventilation device 3 includes three ventilation units 3*a*, and is configured to change the ventilation rate by changing the number of ventilation units 3*a* to be activated. Specifically, one ventilation unit 3*a* may be activated when the ventilation rate is "low"; two ventilation units 3*a* may be activated when the ventilation rate is "high"; and three ventilation units 3*a* may be activated when the ventilation rate is "high". Note that although there are three ventilation units 3*a* in this example, the number of ventilation units 3*a* is not limited to three.

REFERENCE SIGNS LIST

1 air-conditioned space 2 air-conditioning apparatus 2*a* casing 3 ventilation device 4 controller 5 air inlet 6 circulation fan 7 heat exchanger air outlet 9 temperature sensor 10 temperature sensor 11 temperature sensor 12 humidity sensor 13 exhaust fan 14 air-supply fan

The invention claimed is:

1. An air-conditioning ventilation system comprising:
a ventilation device configured to ventilate an air-conditioning target space while controlling a ventilation rate;
an air-conditioning apparatus including a heat exchanger configured to exchange heat between refrigerant and air, the air-conditioning apparatus being configured to operate while controlling an air-conditioning capacity thereof to bring an indoor temperature in the air-conditioning target space to a preset temperature; and
a controller configured to perform
  normal control that causes the ventilation device to operate to ventilate the air-conditioning target space at a ventilation rate corresponding to the air-conditioning capacity of the air-conditioning apparatus, and
  recovery control that controls the ventilation rate of the ventilation device such that an integrated value of an amount of ventilation for a time duration from activation of the ventilation device under the normal control falls within a standard ventilation range including a standard integrated value of an amount of ventilation obtained by causing the ventilation device to operate to ventilate the air-conditioning target space at a standard ventilation rate for a time duration having a same length as the time duration,
wherein the controller causes the ventilation device to operate to increase the ventilation rate when the air-conditioning capacity of the air-conditioning apparatus is within a preset range and the humidity of the air-conditioning target space exceeds a preset humidity, under the normal control during a cooling operation.

2. The air-conditioning ventilation system of any one of claim 1, wherein:
the ventilation device is configured such that the ventilation rate is adjustable in at least three levels including the standard, high that is higher than the standard, and low that is lower than the standard;

when the air-conditioning capacity of the air-conditioning apparatus is intermediate and a humidity in the air-conditioning target space is higher than a preset humidity, the controller sets the ventilation rate of the ventilation device under the normal control during a cooling operation to the high;

when the air-conditioning capacity is intermediate and the humidity in the air-conditioning target space is lower than or equal to the preset humidity, the controller sets the ventilation rate of the ventilation device under the normal control during a cooling operation to the standard; and when the air-conditioning capacity is low or high, the controller sets the ventilation rate of the ventilation device under the normal control during a cooling operation to the low.

3. An air-conditioning ventilation system comprising:

a ventilation device configured to ventilate an air-conditioning target space while controlling a ventilation rate;

an air-conditioning apparatus including a heat exchanger configured to exchange heat between refrigerant and air, the air-conditioning apparatus being configured to operate while controlling an air-conditioning capacity thereof to bring an indoor temperature in the air-conditioning target space to a setting temperature; and a controller configured to perform normal control that causes the ventilation device to operate to ventilate the air-conditioning target space at a ventilation rate corresponding to the air-conditioning capacity of the air-conditioning apparatus, and recovery control that controls the ventilation rate of the ventilation device such that an integrated value of an amount of ventilation for a time duration from activation of the ventilation device under the normal control falls within a standard ventilation range including a standard integrated value of an amount of ventilation obtained by causing the ventilation device to operate to ventilate the air-conditioning target space at a standard ventilation rate for a time duration having a same length as the time duration, wherein the controller causes the ventilation device to operate at a ventilation rate corresponding to the air-conditioning capacity of the air-conditioning apparatus and a temperature of the refrigerant flowing through the heat exchanger of the air-conditioning apparatus, under the normal control during a heating operation.

4. The air-conditioning ventilation system of claim 3, wherein:

the ventilation device is configured such that the ventilation rate is adjustable in at least three levels including the standard, high that is higher than the standard, and low that is lower than the standard;

when the air-conditioning capacity of the air-conditioning apparatus is intermediate and a temperature of the refrigerant flowing through the heat exchanger of the air-conditioning apparatus is lower than or equal to a setting refrigerant temperature, the controller sets the ventilation rate of the ventilation device under the normal control during a heating operation to the high;

when the air-conditioning capacity of the air-conditioning apparatus is intermediate and the temperature of the refrigerant flowing through the heat exchanger of the air-conditioning apparatus is higher than the setting refrigerant temperature, the controller sets the ventilation rate of the ventilation device under the normal control during a heating operation to the standard; and when the air-conditioning capacity of the air-conditioning apparatus is low or high, the controller sets the ventilation rate of the ventilation device under the normal control during a heating operation to the low.

5. The air-conditioning ventilation system of claim 1, wherein when the integrated value becomes equal to a lower limit value of the standard ventilation range, the controller increases the ventilation rate of the ventilation device such that the integrated value becomes equal to the standard integrated value, under the recovery control.

6. The air-conditioning ventilation system of claim 1, wherein when the integrated value becomes equal to an upper limit value of the standard ventilation range, the controller reduces the ventilation rate of the ventilation device such that the integrated value becomes equal to the standard integrated value, under the recovery control.

7. The air-conditioning ventilation system of claim 1, wherein the ventilation device includes a plurality of ventilation units, and is configured to control the ventilation rate by changing the number of ventilation units to be activated.

* * * * *